US006432354B2

(12) United States Patent
Ogawa et al.

(10) Patent No.: US 6,432,354 B2
(45) Date of Patent: Aug. 13, 2002

(54) METHOD AND APPARATUS FOR FEEDING MAGNETIC POWDER AND METHOD FOR MANUFACTURING MAGNET

(75) Inventors: Atsushi Ogawa; Toshiaki Tamura, both of Osaka (JP)

(73) Assignee: Sumitomo Special Metals Co., Ltd. (JP)

(*) Notice: Subject to any disclaimer, the term of this patent is extended or adjusted under 35 U.S.C. 154(b) by 18 days.

(21) Appl. No.: 09/731,913

(22) Filed: Dec. 8, 2000

(30) Foreign Application Priority Data

Dec. 9, 1999 (JP) .......................................... 11-350066

(51) Int. Cl.[7] ............................ B22F 3/12; G01F 13/00

(52) U.S. Cl. .......................... 419/38; 419/66; 425/258; 222/251

(58) Field of Search .................... 419/38, 66; 222/251; 425/258

(56) References Cited

U.S. PATENT DOCUMENTS 2,959,823 A * 11/1960 Schwabe et al.
5,135,375 A * 8/1992 Matsuo et al. ................. 425/3
5,250,255 A * 10/1993 Sagawa et al. ............... 419/39

FOREIGN PATENT DOCUMENTS

| | | |
|---|---|---|
| JP | 02-282404 | 11/1990 |
| JP | 09-035977 | 2/1997 |
| JP | 09-035978 | 2/1997 |
| JP | 10-193189 | 7/1998 |

* cited by examiner

*Primary Examiner*—Ngoclan Mai
(74) *Attorney, Agent, or Firm*—Nixon Peabody LLP; Jeffrey L. Costellia

(57) ABSTRACT

A magnetic powder feeding method for feeding magnetic powder into a cavity of a pressing apparatus includes the steps of: providing magnetic powder outside of the cavity; forming a magnetic field in a space including the cavity; and moving the magnetic powder into the cavity using a force exerted on the magnetic powder by the magnetic field, while the magnetic powder is oriented in a direction of the magnetic field. In the method, the step of moving of the magnetic powder into the inside of the cavity is performed after the start of the application of the magnetic field.

24 Claims, 7 Drawing Sheets

METHOD AND APPARATUS FOR FEEDING MAGNETIC POWDER AND METHOD FOR MANUFACTURING MAGNET

FIELD OF THE INVENTION

The present invention relates generally to a method and apparatus for feeding magnetic powder (hereinafter sometimes referred to as "powder feeding") into a pressing apparatus, a method for forming a magnetic powder compact, and a method for manufacturing a magnet using the magnetic powder feeding method and the powder feeding apparatus.

BACKGROUND OF THE INVENTION

An R-Fe-B type rare earth alloy magnet as a representative high-performance permanent magnet (where R denotes an element or combination of elements selected from the group consisting of rare earth elements and yttrium (Y)), Fe denotes iron, and B denotes boron) has a structure including a major phase of ternary system tetragonal crystal compound ($R_2Fe_{14}B$ phase) and an R-rich grain boundary phase, and exhibits excellent magnetic properties. The R—Fe—B type magnet is now used in wide fields from various electric appliances for domestic use to peripheral devices for a mainframe computer. There are strong demands towards miniaturization, weight reduction, and advanced performance, so that an R—Fe—B type permanent magnet with much higher performance is desired.

In order to increase the residual magnetic flux density ($B_r$) of an R—Fe—B type sintered magnet, the following are required: (1) to increase a total volume fraction of ferromagnetic $R_2Fe_{14}B$ phases, (2) to make a density of sintered compact closer to a theoretical density of the major phase, and (3) to align an axis of easy magnetization of the major phase crystal grains.

When magnetic powder is to be fed into a cavity (a powder compacting space) of a pressing apparatus, conventionally, a feeder box (or a feeder shoe) is slid onto the cavity, and the powder is gravity-fed from the feeder box into the cavity.

FIGS. 1A to 1C schematically show a conventional powder feeding method by means of a feeder box. According to the conventional method, as shown in FIGS. 1A to 1C, when a feeder box 13 slides in a transverse direction over a cavity 12 constituted by a die 10 and a lower punch 11 of a powder pressing apparatus, magnetic powder 14 in the feeder box 13 is filled in the cavity 12. In this method, an upper portion of the filling powder is pressurized downwards (in a direction indicated by an arrow A) by pressurizing means such as a leveling rod (not shown) disposed in the feeder box 13 for the purpose of suppressing feeding inconsistency.

According to such a conventional filling method using a feeder box, the powder can be surely filled in the cavity. In addition, the volume of the filling powder can be controlled to be substantially constant by means of the "leveling" done by the trailing edge of the feeder box.

Even in the case where the volume of the filling powder is constant, however, when a pressure applying to the powder by a leveling bar or the like is varied, the filling density is also varied. This eventually results in increased feeding inconsistency.

Moreover, according to the conventional method, the flowability of the powder becomes lower by a strong pressure due to the self-weight of the powder in a position closer to a bottom portion of the cavity, which leads to poor alignment of the powder in a magnetic field. As a result, as for the filling powder, the degree of alignment in a position closer to the bottom portion of the cavity is lower than the degrees of alignment in other portions. There arises a problem in that the magnetic properties are varied depending on positions.

This problem arises especially in the case where an R—Fe—B type rare earth magnet is to be manufactured. R—Fe—B type magnetic powder has a larger specific gravity as compared with ferrite magnetic powder. For this reason, in the case where the R—Fe—B type magnetic powder is filled in the cavity, a larger self-weight pressure is generated in a position closer to the cavity bottom portion, as compared with the case of the ferrite magnetic powder. Accordingly, in the case where the R—Fe—B type magnetic powder is used, the deterioration in powder alignment cannot be sufficiently suppressed even if the friction coefficient of powder particles is lowered by adding a lubricant to powder, or even if the intensity of the applied aligning magnetic field is increased. Thus, the magnetic properties of the final magnet product are likely to be degraded.

SUMMARY OF THE INVENTION

The invention provides a magnetic powder feeding method that can reduce a variation in degrees of alignment depending on the positions in the cavity.

The invention also provides a method for forming a compact with a uniform and high degree of alignment by using the magnetic powder feeding method, and a method for manufacturing a magnet with excellent magnetic properties.

The invention also provides a magnetic powder feeding apparatus that is suitably used in conjunction with the magnetic powder feeding method.

A magnetic powder feeding method of the present invention for feeding magnetic powder into a cavity of a pressing apparatus includes the steps of: placing the magnetic powder outside the cavity; forming a magnetic field in a space including the cavity; and moving the magnetic powder into the cavity using a force exerted on the magnetic powder by the magnetic field, while the magnetic powder is oriented in a direction of the magnetic field, wherein the step of moving of the magnetic powder into the inside of the cavity is performed after the start of the application of the magnetic field.

A magnetic powder feeding method of the present invention for feeding magnetic powder into a cavity of a pressing apparatus, includes the steps of: placing the magnetic powder outside the cavity; forming a magnetic field in a space including the cavity; and dropping the magnetic powder into the inside of the cavity by using an electromechanical mechanism that operates in an interlocking manner with the formation of the magnetic field.

In a preferred embodiment, a magnetic powder is moved into the cavity at a timing when an intensity of the magnetic field reaches a predetermined value.

In a preferred embodiment, the direction of the magnetic field includes a direction perpendicular to a pressing direction in the inside of the cavity.

In a preferred embodiment, the magnetic field is directed substantially in a horizontal direction in the inside of the cavity.

In a preferred embodiment, a member for preventing the magnetic powder from moving until the magnetic field is formed is inserted between the magnetic powder and the cavity, and after the magnetic field is formed, the member is driven, thereby enabling the magnetic powder to move.

A magnetic powder feeding method of the present invention for feeding magnetic powder into a cavity of a pressing apparatus includes the steps of: placing the magnetic powder above the cavity; forming an aligning magnetic field in a space including the cavity; and dropping the magnetic powder into the cavity while the magnetic powder is oriented in a direction of the magnetic field by using a force by which the aligning magnetic field attracts the magnetic powder.

In a preferred embodiment, the force exerted on the magnetic powder by the aligning magnetic field is in the same direction as the force of gravity on the magnetic powder.

In a preferred embodiment, the magnetic powder of an amount to be filled in the cavity is first placed above the cavity.

In a preferred embodiment, a direction of the aligning magnetic field includes a direction perpendicular to a pressing direction of the pressing apparatus in the inside of the cavity.

In a preferred embodiment, the aligning magnetic field is directed in a horizontal direction in the inside of the cavity.

In a preferred embodiment, a member for preventing the magnetic powder from dropping until the aligning magnetic field is formed is inserted between the magnetic powder and the cavity, and after the aligning magnetic field is formed, the member is driven, thereby enabling the magnetic powder to drop.

In a preferred embodiment, the step of placing the magnetic powder above the cavity is performed by using a powder vessel provided with an open and close mechanism that maintains a closed state by the weight of the magnetic powder, but can be downwardly opened by the force of the aligning magnetic field attracting the magnetic powder.

A method for producing a magnetic powder compact of the present invention includes: a step of feeding magnetic powder into a cavity of a pressing apparatus by the above-described magnetic powder feeding method; and a pressing step for compressing and compacting the magnetic powder fed in the cavity.

In a preferred embodiment, in the pressing step, the magnetic powder is compressed and compacted while the aligning magnetic field is continuously applied.

A method for manufacturing a magnet of the present invention includes: a step of feeding magnetic powder into a cavity of a pressing apparatus by the above-described magnetic powder feeding method; a pressing step for compressing and compacting the magnetic powder fed in the inside of the cavity, thereby producing a compact; and a step of sintering the compact.

In a preferred embodiment, in the pressing step, the magnetic powder is compressed and compacted while the aligning magnetic field that is applied in the step of feeding the magnetic powder into the cavity is continuously applied.

In a preferred embodiment, the aligning magnetic field applied in the pressing step has substantially the same intensity distribution as that of the aligning magnetic field applied when the magnetic powder is filled in the inside of the cavity.

In a preferred embodiment, at least in the cavity, the direction of the aligning magnetic field applied in the pressing step is the same as the direction of the aligning magnetic field applied when the magnetic powder is filled in the inside of the cavity.

In a preferred embodiment, the maximum magnetic field intensity of the aligning magnetic field applied in the pressing step is larger than the maximum magnetic field intensity of the aligning magnetic field applied when the magnetic powder is filled in the inside of the cavity.

A magnetic powder feeding apparatus of the present invention includes: a member for supporting magnetic powder against the weight of the magnetic powder; and means for dropping the magnetic powder upon the application of an aligning magnetic field.

A magnetic powder feeding apparatus of the present invention includes: a member for supporting magnetic powder against the weight of the magnetic powder; and means for performing an electromechanical operation coincide with the application of an aligning magnetic field, thereby dropping the magnetic powder.

A magnetic powder feeding apparatus of the present invention includes: a vessel for containing magnetic powder; a bottom plate that is pivotably supported by the vessel and on which the magnetic powder is placed; and open and close means for closing the bottom plate against the weight of the magnetic powder, wherein the open and close means pivots the bottom plate open when an aligning magnetic field formed by a pressing apparatus downwardly attracts the magnetic powder, thereby dropping the magnetic powder into a cavity of the pressing apparatus positioned below.

In a preferred embodiment, the vessel and the bottom plate are made of a nonmagnetic material.

A powder pressing apparatus of the present invention includes: the above-described magnetic powder feeding apparatus; and a die constituted by a magnetic material having a saturation magnetization of 0.05 to 1.2 tesla.

DETAILED DESCRIPTION OF THE INVENTION

Figure 1A:
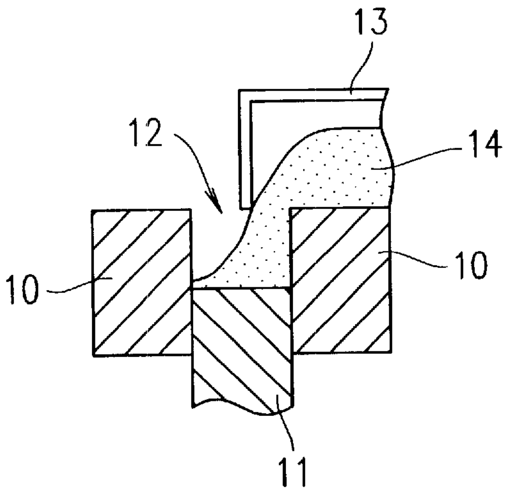
FIGS. 1A through 1C are cross-sectional views schematically illustrating the steps of a conventional powder feeding method by using a feeder box.
Figure 1B:
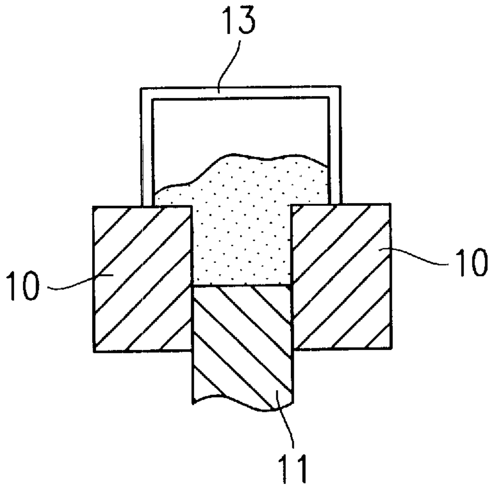
Figure 1C:
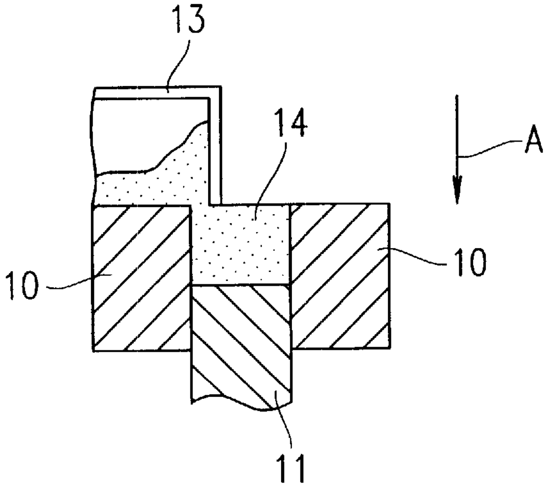

The foregoing summary, as well as the following detailed description of the preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown.

The inventors of the invention have focused attention on a phenomenon that, when an aligning magnetic field is formed in a powder pressing apparatus, magnetic powder which is put in a position distant from a portion indicating a highest value of a magnetic field intensity also receives a force from the above-mentioned aligning magnetic field, and is likely to move to a position with a higher magnetic field intensity. In a magnetic powder feeding method of the present invention, after magnetic powder is positioned outside a cavity of a pressing apparatus, an aligning magnetic field is formed in a space including the cavity. Then, the magnetic powder is filled in the cavity, while the magnetic powder is aligned by a force exerted by the aligning magnetic field.

According to the present invention, when magnetic powder is to be filled in a cavity, the aligning magnetic field is applied on the falling powder, so that the magnetic powder during the filling step can be sufficiently aligned. Therefore, when the filling of the powder in the cavity is completed, the magnetic powder will have already been at least partially aligned.

Hereinafter, preferred embodiments of the present invention will be described with reference to the accompanying drawings.

Figure 2A:
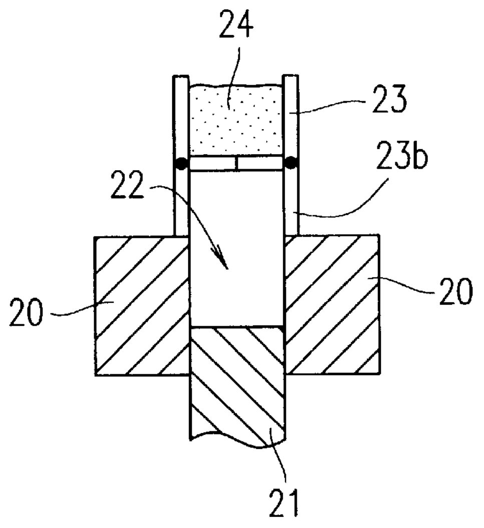
FIGS. 2A through 2C are cross-sectional views illustrating the steps and main portions of a pressing apparatus and a magnetic powder feeding apparatus according to an embodiment of the present invention.
Figure 2B:
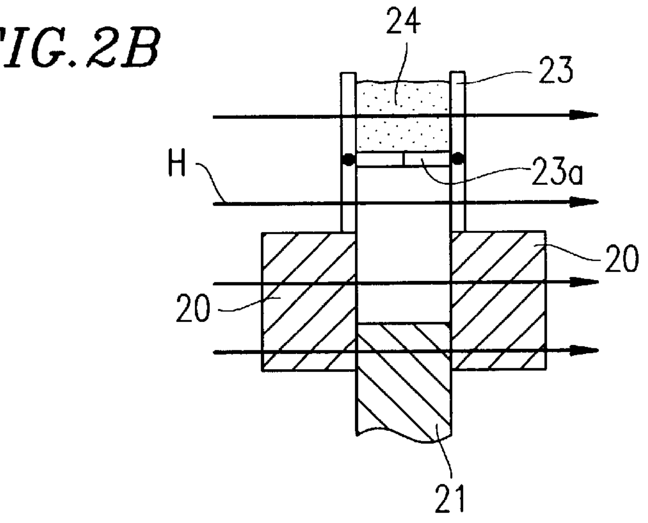
Figure 2C:
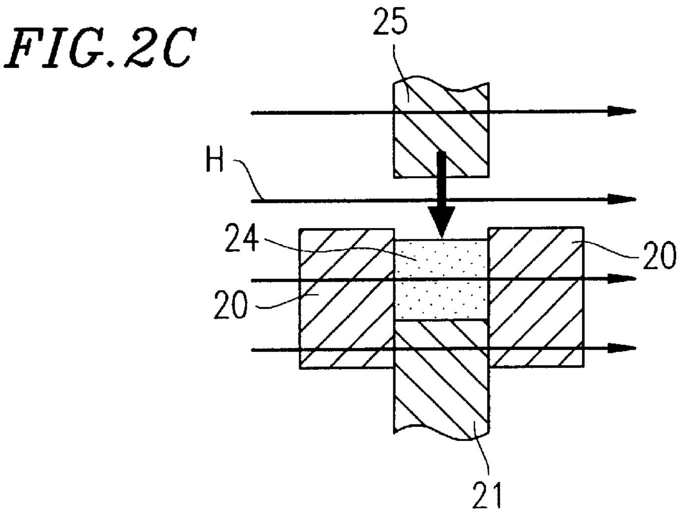

FIGS. 2A through 2C illustrate main portions of a pressing apparatus and a magnetic powder feeding apparatus according to an embodiment of the present invention. FIG. 2A illustrates a condition where a magnetic powder feeding apparatus 23 of the present invention is disposed above a cavity 22 of a pressing apparatus. FIG. 2B illustrates a condition where an aligning magnetic field is applied. FIG. 2C illustrates a condition where the magnetic powder feeding apparatus 23 is removed from the above of the cavity 22 while the aligning magnetic field is applied, and an upper punch 25 is being brought down.

In this embodiment, before the aligning magnetic field is applied, as shown in FIG. 2A, the magnetic powder feeding apparatus 23 is disposed above the cavity 22 constituted by a die 20 and a lower punch 21. Magnetic powder 24 having a volume that is smaller than a content volume of the cavity 22 is accommodated in the powder feeding apparatus 23.

Thereafter, as shown in FIG. 2B, an aligning magnetic field H is applied, and a magnetic force is exerted on the magnetic powder 24 in the powder feeding apparatus 23. The aligning magnetic field H exhibits such a magnetic field distribution that the maximum magnetic field intensity appears in the vicinity of the center portion of the cavity 22. Thus, the magnetic powder 24 receives a magnetic force in a direction being attracted to the center of the cavity. The aligning magnetic field H is applied in a pulse-like manner, or a magnetic field may include a plurality of pulses and/or may be static.

Next, in the powder feeding apparatus 23, a supporting member (a bottom plate) 23*a* on which the magnetic powder 24 is placed is opened downwards, and the magnetic powder 24 is dropped into the inside of the cavity 22. In this way, a constant volume of magnetic powder 24 is filled in the cavity 22. The magnetic powder 24 is dropped at any timing after the start of the application of the aligning magnetic field H. Immediately after the start of the application of the aligning magnetic field H, the magnetic field intensity reaches the highest level in a relatively short time (0.2–0.5 seconds, for example). The filling of the powder may be started before the magnetic field intensity reaches the highest level. For example, in the middle of a period in which the magnetic field intensity in the cavity center portion increases from zero to several hundreds of kA/m, as long as the powder filling (the powder drop) is started with the magnetic field intensity of about 160 kA/m, a sufficient alignment can be obtained. In this embodiment, the bottom plate 23*a* is opened by using a force downwardly attracting the magnetic powder 24 by the aligning magnetic field H. The construction of the powder feeding apparatus 23 will be described later in detail.

In this embodiment, an upper face of the magnetic powder 24 dropped in the inside of the cavity 22 is lower than an upper face of the die 20. In other words, an amount of powder in the powder feeding apparatus 24 is previously adjusted so as to be fully accommodated in the inside of the cavity 22. For this reason, it is unnecessary to make a filling amount uniform by leveling the upper portion of the filling powder 24 as in the prior art. According to this embodiment, feeding inconsistency is minimized.

In this embodiment, since a previously measured amount of powder is dropped, a center portion of the upper face of the filled powder is piled up, and a raised portion is formed. The amount of powder is preferably regulated so that the above-mentioned powder raised portion is not dragged when the powder feeding apparatus travels over the cavity.

The magnetic powder 24 is oriented uniformly in one direction by the aligning magnetic field H during the dropping into the cavity 22. Thus, a highly uniform alignment is attained by the powder throughout the bottom, middle, and top portions of the cavity 22.

After the powder filling, as shown in FIG. 2C, the powder feeding apparatus 23 is moved to a position (not shown) away from the cavity 22 while the aligning magnetic field H is applied. Thereafter, the upper punch 25 of the pressing apparatus is brought down. The magnetic powder 24 filled in the cavity 22 is compressed between the upper punch 25 and the lower punch 21, and compacted in the aligning magnetic field H. The direction of the powder particles aligned during the powder filling may be changed by a frictional force received in the compression and compaction, or other forces. In order to prevent such a change, it is preferred that the aligning magnetic field H be continuously applied during the compression and compaction. It is understood that the aligning magnetic field H applied during the powder filling and the aligning magnetic field H applied during the compression and compaction do not necessarily have the identical intensities.

In the above-described embodiment, the aligning magnetic field is formed by using the same magnetic field forming apparatus (such as a coil) that is not shown during the powder filling and during the compression and compaction. Alternatively, an auxiliary magnetic field forming apparatus may be provided for the powder filling, and the magnetic field intensity distributions are made to be different between the powder filling and the compression and compaction.

After the press in the aligning magnetic field, the compact of the magnetic powder is taken out of the pressing apparatus. After known manufacturing processes such as a sintering step and an aging treatment step, for example, the compact is eventually manufactured into a permanent magnet product.

The term "magnet" in this specification is understood to not only include a permanent magnet in a magnetized condition, but also should include a magnet before its magnetization.

Figure 3:
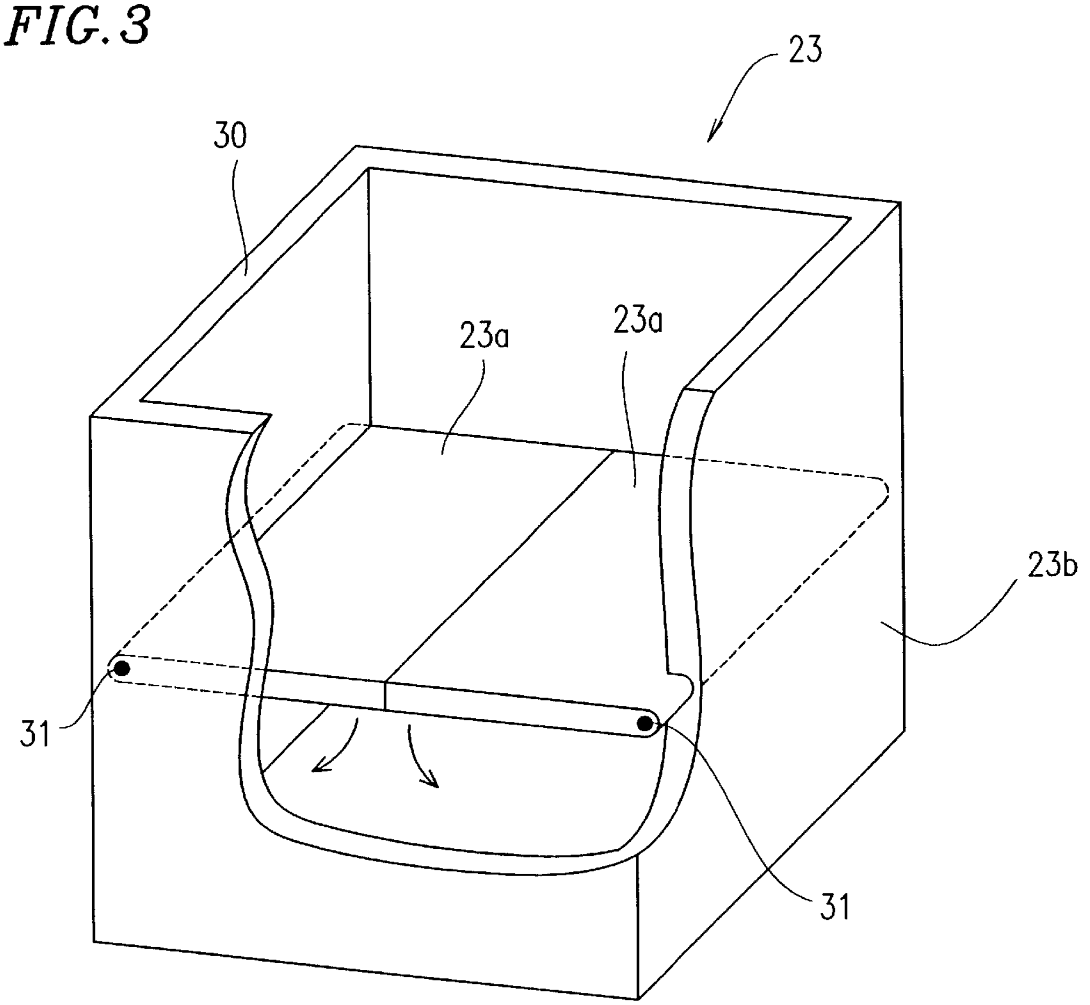
FIG. 3 is a perspective view illustrating a construction of a magnetic powder feeding apparatus that can be used in an embodiment of the present invention.

FIG. 3 is a perspective view schematically illustrating the construction of the magnetic powder feeding apparatus 23. The powder feeding apparatus 23 includes a vessel 30 in which magnetic powder is accommodated, and a supporting member (a bottom plate) 23*a* on which the magnetic powder is placed. The vessel 30 comprises a side plate portion 23*b*. The bottom plate 23*a* is pivotably supported by a fulcrum portion 31 disposed on the vessel 30. The apparatus 23 also includes an open and close mechanism (not shown in FIG. 3) for holding the bottom plate 23*a* closed against the weight of the magnetic powder. The open and close mechanism pivots the bottom plate 23*a* in a direction indicated by arrows in FIG. 3 when the aligning magnetic field exerts a force downwardly attracting the magnetic powder, so that the magnetic powder on the bottom plate 23*a* can be dropped into the cavity, which is positioned below. The construction of the open and close mechanism is not limited to the above-described construction. In the case where a static magnetic field is applied as the aligning magnetic field, after 0.1 through 1.0 seconds elapse from the start of the application of the magnetic field, the mechanism may perform the open and close operation by a power of a motor or the like in response to an electric signal generated in accordance with the application of the aligning magnetic field, instead of the magnetic force. Alternatively, in the case where a pulse magnetic field is applied, a mechanism which performs an open and close operation by a power of a motor or the like substantially at the same time or after several seconds of the application of the magnetic field.

Figure 4A:
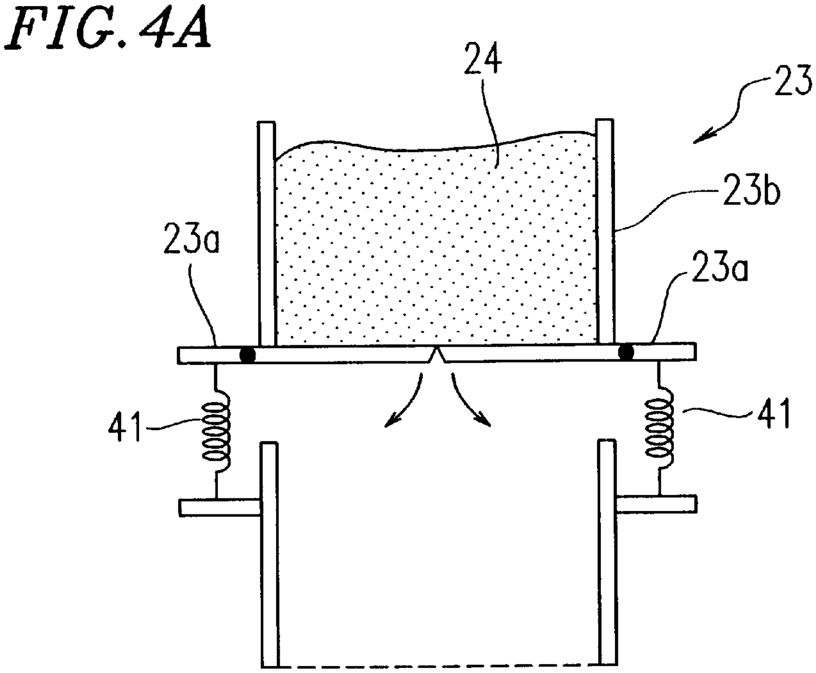
FIGS. 4A and 4B are views illustrating an open and close mechanism in a powder feeding apparatus according to the present invention.
Figure 4B:
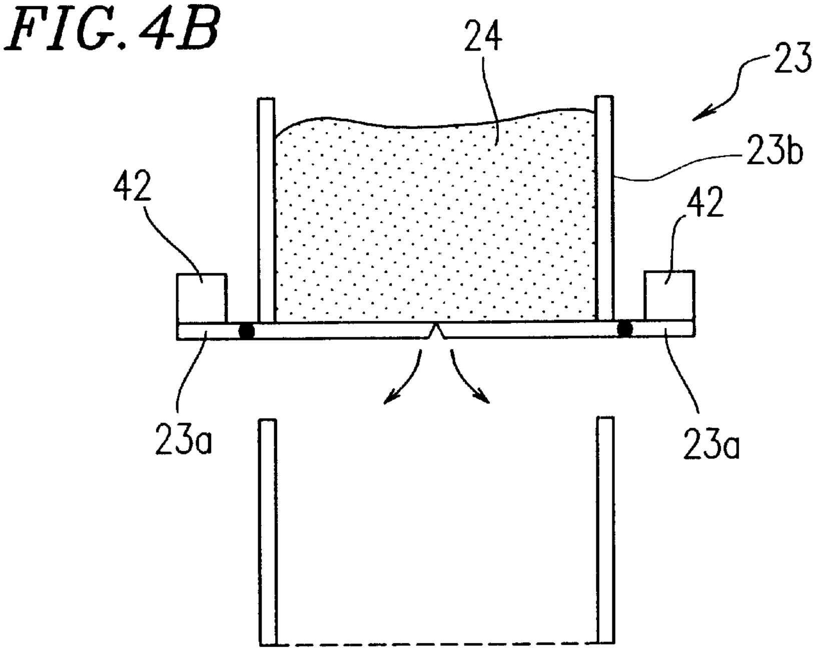

FIGS. 4A and 4B illustrate other open and close mechanisms for the magnetic powder feeding apparatus 23, respectively.

A time period for applying the pulse magnetic filed is about 1/1000 seconds. In consideration of a time period required for the open and close operation, the open and close operation may be started slightly before the application of the pulse magnetic field.

In the case of the apparatus shown in FIG. 4A, one end of the bottom plate 23*a* is connected to a portion of the apparatus 23 via a spring 41. The powder 24 is filled on the bottom plate 23*a*, the weight of the powder 24 is downwardly applied on the bottom plate 23*a*, and a force for pivoting the bottom plate 23*a* in a direction indicated by an arrow is generated. The pivotal motion of the bottom plate 23*a* is prevented by an elastic force of the spring 41. When the aligning magnetic field is applied and the aligning magnetic field downwardly attracts the powder 24, an opposite moment that is larger than the moment of the elastic force of the spring 41 is applied on the bottom plate 23*a*. As a result, the bottom plate 23*a* pivots in the direction indicated by the arrow, so that the powder 24 is dropped.

In the case of the apparatus shown in FIG. 4B, a counterbalancing weight 42 is fixed to one end of the bottom plate 23*a*. As in the case of FIG. 4A, when the powder 24 is filled on the bottom plate 23*a*, the weight of the powder 24 is downwardly applied on the bottom plate 23*a*, and a force for pivoting the bottom plate 23*a* in a direction indicated by an arrow is generated. The pivotal motion of the bottom plate 23*a* is prevented by the counter-balancing weight 42. When the aligning magnetic field is applied and the aligning magnetic field downwardly attracts the powder 24, an opposite moment that is larger than the moment of the counterbalancing weight 42 is applied on the bottom plate 23*a*. As a result, the bottom plate 23*a* pivots in the direction indicated by the arrow, and the powder 24 is dropped.

In the open and close mechanisms shown in FIGS. 4A and 4B, a pair of bottom plates 23*a* are opened and closed in the center portion. Alternatively, adjacent end portions of the respective bottom plates 23*a* may be used as fulcrum portions for the pivotal motion.

Instead of the spring 41, other elastic members can be used. For example, a resilient rubber member may be used. Such elastic members generate a force standing against the weight of the powder 24. When the aligning magnetic field attracts the powder, the force exerted by the elastic member cannot resist the attracting forces (magnetic forces) between the powder and the aligning magnetic field. Adjustment of the elastic force is relatively easily accomplished, because the attractive force of the aligning magnetic field is relatively large compared with the force exerted by the weight of the magnetic powder. As an example, where the maximum magnetic field intensity of the aligning magnetic field is 160 kA/m e, the magnetic force that is received by the magnetic powder 24 in a position distant by about several tens of millimeters through several hundreds of millimeters from the point of maximum magnetic field intensity is sufficiently large that the weight of the magnetic powder may be ignored. Accordingly, the adjustment of the elastic force is relatively easy.

In accordance with the timing at which an electric power is supplied to a coil or the like for forming the aligning magnetic field, the bottom plate (the supporting member) 23A may be electromechanically opened or closed. For example, the bottom plate 23A may be pivoted or slid by a stepping motor. In this case, the stepping motor is driven immediately after the application of the aligning magnetic field for pivoting or sliding the bottom plate, so that the powder on the bottom plate is downwardly dropped.

The apparatus 23 is preferably designed so that the inner side face of the side plate portion 23*b* and the inner side face of the cavity are arranged substantially in one and the same plane, or that the inner side face of side plate portion 23*b* is positioned on an inner side of the cavity than the inner side face of the cavity. With such configurations, it is possible to prevent part of powder during the dropping from dropping on the die due to the attraction by the magnetic field.

Alternatively, in an embodiment that is not shown, a dish-like container that is supported in such a manner that it can be pivoted at least by 180 degrees may be used instead of the bottom plate. The dish-like container is inverted by 180 degrees when the aligning magnetic field is applied, so that the powder in the container can be downwardly dropped.

In an alternative system in which the supporting member of the powder is slid in a horizontal transverse direction (a shutter system) is adopted, it is easier to locate the magnetic powder in the powder feeding apparatus 23 closer to the upper face of the die, as compared with the cases in which the mechanisms shown in FIGS. 4A and 4B are adopted. The position of the magnetic powder in the powder feeding apparatus 23 measured from the upper face of the die affects the powder fall distance during the filling. This will be described later with reference to FIG. 6.

Next, with reference to FIGS. 5A and 5B, a mechanism in which an electromechanical force such as a motor or an air cylinder is used as a force required for the open and close operation will be described.

Figure 5A:
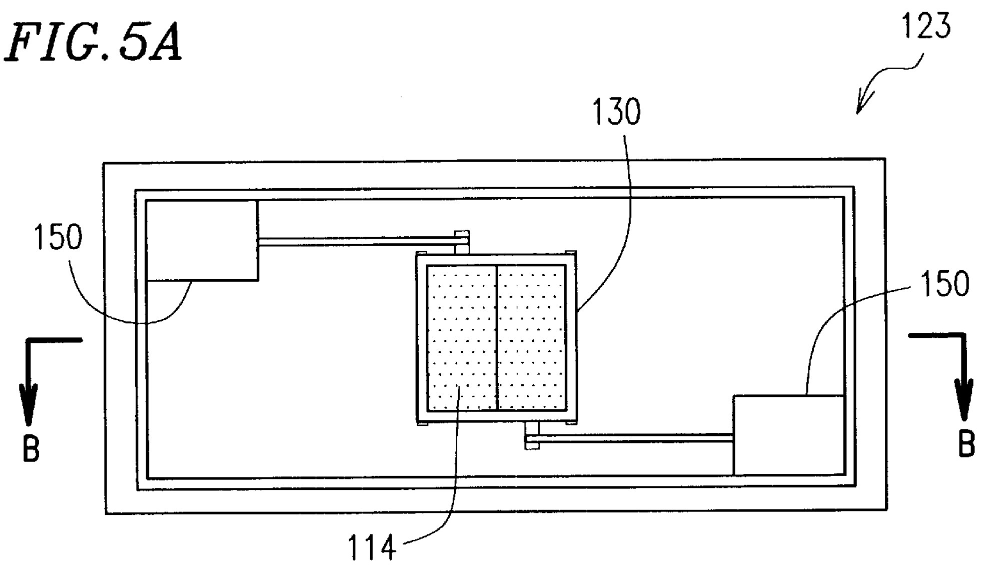
FIG. 5A is a top view schematically illustrating a construction of a magnetic powder feeding apparatus 123 suitably used in the present invention.

FIG. 5A is a top view illustrating a magnetic power feeding apparatus 123 of another type suitably used in the present invention. FIG. 5B is a cross-sectional view taken along a line B—B. The power feeding apparatus 123 includes a vessel 130 for accommodating magnetic powder therein, and a supporting member (a bottom plate) 123*a* on which magnetic powder 114 is placed. The bottom plate 123*a* is pivotably supported by a fulcrum portion 131 such as a pin disposed in the vessel 130. The apparatus 123 is provided with a driving device 150 for controlling the open and close operation by closing the bottom plate 123*a* standing against the self-weight of the magnetic powder 114. The driving device 150 can pivot the bottom plate 123*a* in a direction indicated by an arrow in FIG. 5B by using the fulcrum portion 131 as a center axis, so as to drop the magnetic powder 114 on the bottom plate 123*a* into a cavity (not shown) positioned below, when an aligning magnetic field is applied, or after a predetermined period of time elapses from the application of the aligning magnetic field. As the driving device 150, various devices such as a motor, an actuator, and an air cylinder can be used.

Figure 5B:
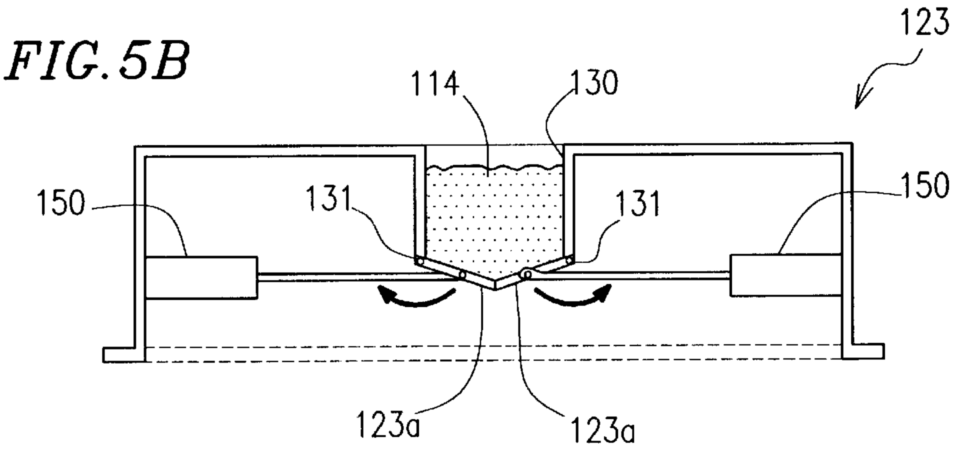
FIG. 5B is a cross-sectional view taken along line B—B in FIG. 5A.

In the example illustrated in FIGS. 5A and 5B, the bottom portion of the vessel 130 closed by the bottom plate 123*a* is opened by an electromechanical driving force, instead of a magnetic force. A timing at which the magnetic powder 114 in the vessel 130 is downwardly dropped by moving the bottom plate 123*a* can be arbitrarily set by adjusting a time at which an electric signal for controlling the operation of the driving device 150 is transmitted from a control circuit (not shown) to the driving device 150. Alternatively, the timing can be arbitrarily set by adjusting a time at which an electric power or an air required for the operation of the driving device 150 is supplied to the driving device 150.

In the case of the powder feeding apparatus 123 illustrated in FIGS. 5A and 5B, the bottom plate 123*a* is not opened or closed by using a magnetic power, so that a greater range of materials and sizes for the bottom plate 123*a* may be used. In addition, the timing at which the application of the aligning magnetic field is started, and the timing at which the powder feeding is started can be arbitrarily adjusted. It is important in the present invention that the aligning magnetic field is applied to the magnetic powder during the moving (dropping), and that the degree of alignment is increased by reducing the friction between powder particles. The present invention is not limited to the case where the open and close operation of the vessel bottom plate is performed by a magnetic force. According to the invention, a predetermined amount of powder is accommodated in the vessel, and the powder is filled in the cavity, so that the amount of filling powder cannot be varied in every filling step.

In this embodiment, the direction of the aligning magnetic field is a horizontal transverse direction, and hence perpendicular to a direction in which the aligning magnetic field attracts the powder (the pressing direction). Accordingly, the powder particles filled in the cavity are aligned in the horizontal transverse direction. The powder particles are linked in a chain-like manner in the horizontal transverse direction due to a magnetic interaction. The powder particles positioned in an upper face of the filling powder are also linked in the horizontal direction. As a result, the powder is not overflowed to the outside of the cavity, and the powder can be easily and fully accommodated in the cavity.

In the case where the direction of the aligning magnetic field is set to be a vertical direction, the direction in which the magnetic field attracts the magnetic powder (the pressing direction) is in parallel to the aligned direction. Thus, the powder particles filled in the cavity are aligned in the vertical direction. In such a case, the filled powder particles are linked in a chain-like manner in the vertical direction due to the magnetic interaction. As a result, the powder particles positioned in the upper face of the filled powder are likely to be linked externally to the cavity. There is a fear that part of the powder may spread out to the outside of the cavity.

As described above, in the present invention, it is preferred that the direction of the aligning magnetic field (the aligning direction) be perpendicular to the pressing direction (the filling direction).

In this embodiment, a direction of a force (an attracting force) that is exerted on the magnetic powder by the aligning magnetic field perfectly agrees with the direction of gravity. The present invention is not limited to this. For example, the pressing apparatus illustrated in FIGS. 2A through 2C may be inclined with respect to the vertical direction. In this case, the direction of the force of the aligning magnetic field will not be the same as the direction of gravity.

A die constituting a cavity which is filled with powder is preferably formed of a metal material with a saturation magnetization of 0.05 to 1.2 tesla, as described in Japanese Laid-Open Publication No. 9-35978. By the die formed of such a metal material, the magnetic field intensity distribution in the cavity during the application of the aligning magnetic field is uniform, and the magnetic properties of a magnet can be improved. In the case where one die includes a plurality of cavities, there is a tendency that the magnetic field intensity distributions in respective cavities are non-uniform. For this reason, in the case where one die includes a plurality of cavities, it is especially desired that the die is formed by using the above-mentioned metal material.

Next, an exemplary method for preparing magnetic powder to be filled will be described.

First, a molten alloy of an R—Fe—B type alloy containing, for example, 11 to 18 at % of R (R denotes an element or combination of elements selected from the group consisting of rare earth elements and Y), 4 to 10 at % of B, the balance Fe, and incidental impurities is prepared. Part of Fe may be substituted with one kind or two kinds of Co and Ni, or part of B may be substituted with C.

Next, the molten alloy is solidified into a thin plate having a thickness of 0.03 to 10 mm by a strip casting method. After a cast strip having an organization in which the R-rich phase is separated in a minute size of 5 micrometers or less is casted, the cast strip is accommodated in a container that can intake and exhaust. After the air in the container is substituted with an $H_2$ gas, an $H_2$ gas with a pressure of 0.03 MPa to 1.0 MPa is supplied into the container, so as to form a decay alloy powder (hydrogen absorption processing). After hydrogen desorption processing, the decay alloy powder is comminuted in an inert gas flow by a jet mill or the like.

The cast strip as a magnet material used in the present invention is suitably produced by a strip casting method by a single roll method or a twin roll method using a molten alloy of a specific composition. Depending on a plate thickness of a cast strip to be produced, it is possible to distinguish between the use of the single roll method and the use of the twin roll method. In the case where the cast strip is thick, it is preferred that the twin roll method be used. In the case where the cast strip is thin, it is preferred that the single roll method be used.

If the thickness of the cast strip is smaller than 0.03 mm, the quenching effect increases, so that there is a possibility that the diameter of a crystal grain is too small. If the diameter of the crystal grain is too small, individual grain particles are polycrystallized in comminution, and the crystal orientation cannot be aligned. This results in the deterioration of magnetic properties. Conversely, if the thickness of the cast strip exceeds 10 mm, the cooling rate becomes slow. Thus, the á-Fe is easily crystallized, and the R-rich phase may unbalancedly exist.

The hydrogen absorption processing may be performed, for example, as follows. Specifically, after a cast strip which is cut so as to have a predetermined size is inserted into a material case, the material case is charged in a hydrogen furnace that can be sealed. Then, the hydrogen furnace is sealed. Next, after the hydrogen furnace is sufficiently evacuated, a hydrogen gas with a pressure of 30 kPa to 1.0 MPa is supplied into the container, so that the cast strip is caused to absorb hydrogen. The hydrogen absorbing reaction is an exothermic reaction, so that a cooling piping for supplying cooling water is preferably disposed around in an outer circumference of the furnace for preventing the temperature in the furnace from increasing. By the hydrogen absorption, the cast strip alloy is embrittled (coarse pulverization).

After the coarsely pulverized alloy is cooled, the alloy is subjected to the hydrogen desorption processing in a vacuum. In a particle of the alloy powder obtained by the hydrogen desorption processing, microcracks exist. For this reason, the alloy powder can be minutely comminuted in a short time in a succeeding step by a ball mill, a jet mill, or the like. Accordingly, the alloy powder having the above-described particle size distribution can be prepared. A preferred embodiment of the hydrogen comminution processing is disclosed in Japanese Laid-Open Publication No. 7-18366.

The minute comminution is preferably performed by a jet mill using an insert gas ($N_2$ or Ar, for example). Alternatively, a ball mill using an organic solvent (for example, benzene, toluene, or the like) may be employed or an attriter pulverization may be performed.

A fluid lubricant containing fatty acid ester or the like as a main component is preferably added to the material alloy powder. The amount of addition is, for example, 0.15 to 5.0 mass %. As the fatty acid ester, caproic acid methyl, caprylic acid methyl, lauric acid methyl, or the like are listed. The lubricant may include a component such as a binder. It is important that the lubricant volatilizes in the subsequent step so as to be removed. In the case where the lubricant is a solid type which is not easily mixed with the alloy powder, the lubricant may be diluted by a solvent. As the solvent, petroleum solvent represented by isoparaffin, naphthene solvent, or the like can be used. The timing for adding the lubricant is arbitrary, and the addition may be performed before the minute comminution, during the minute comminution, or after the minute comminution. The fluid lubricant coats surfaces of the powder particles so as to prevent oxidation of the particles. In addition, the fluid lubricant attains the functions of making the density of compacts in pressing uniform, and of suppressing the disorder in alignment.

It is understood that the present invention is not limited to the magnetic powder that is prepared by the above-described method. The present invention can be applied to a method for manufacturing an anisotropic bonded magnet, in addition to the method for manufacturing a sintered magnet.

EXAMPLE

In this example, after magnetic powder was prepared from a molten alloy of Nd—Fe—B type alloy containing 30 wt % of Nd, 2 wt % of Dy, 0.5 wt % of Co, 1 wt % of B, and the balance Fe, permanent magnets were produced by compacting the magnetic powder and sintering the powder compact. The method for preparing the magnetic powder is the same as the method in the above-described preferred embodiments. The magnetic properties of the permanent magnets were evaluated.

The magnetic powder was used, and the powder filling was performed by a method explained in connection with the preferred embodiment. Thereafter, the compression and compaction of the powder were performed in an aligning magnetic field. Then, permanent magnets were manufactured by way of a sintering step at temperatures of 1030 to 1200 degrees Celsius for about 4 to 8 hours. Magnetic properties of respective portions for one permanent magnet were evaluated. The evaluated results are shown in Table 1. The size of the magnet was 80 mm×52 mm×23 mm, the compaction density was 4.1 g/cm$^3$, the maximum intensity of the aligning magnetic field was 810 kA/m, and the powder fall distance in the filling was about 150 mm. As a comparative example, measured results of a magnet in which powder filling is performed by a prior-art feeder box are shown in Table 2.

TABLE 1

| Example of the Invention | | |
|---|---|---|
| Position | $B_r$ (T) | $(BH)_{max}$ (KJ/m$^3$) |
| Upper Portion | 1.38 | 362.0 |
| Center Portion | 1.38 | 362.8 |
| Lower Portion | 1.38 | 361.2 |

TABLE 2

| Comparative Example | | |
|---|---|---|
| Position | $B_r$ (T) | $(BH)_{max}$ (KJ/m$^3$) |
| Upper Portion | 1.37 | 348.5 |
| Center Portion | 1.37 | 349.3 |
| Lower Portion | 1.36 | 343.7 |

As is seen from Table 1, in the case of the example, the residual magnetic flux density $B_r$ and the maximum energy product $(BH)_{max}$ show the identical values in the upper portion, the center portion, and the lower portion of the comparative prior art magnet. That is, uniform properties are shown. On the other hand, the residual magnetic flux density $B_r$ and the maximum energy product $(BH)_{max}$ in the lower portion of the magnet are lower than those of the other portions. That is, there is a variation in magnetic properties.

In comparison between Table 1 and Table 2, it is seen that the average magnetic properties of the entire magnet according to the present invention are superior to the conventional one.

Figure 6:
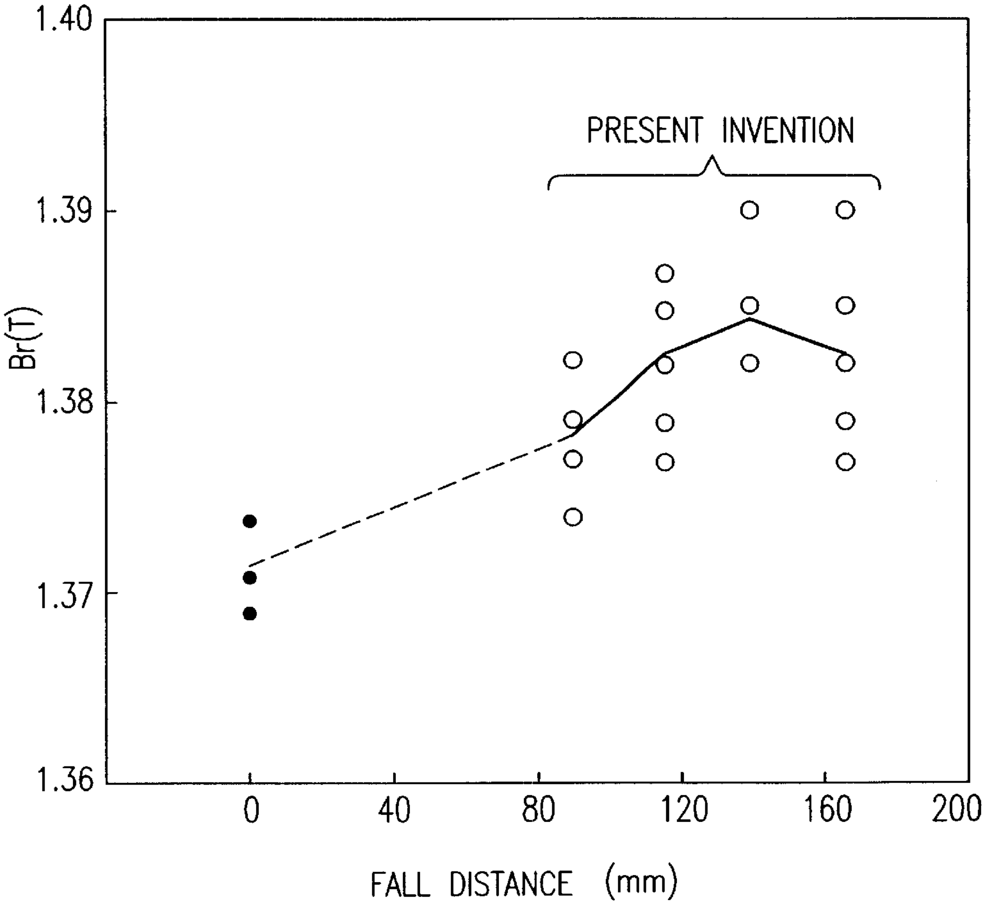
FIG. 6 is a graph showing a relationship between a fall distance of magnetic powder and a residual magnetic flux density $B_r$ for the embodiment of the present invention and a comparative example.

FIG. 6 is a graph showing a relationship between a fall distance and a magnet characteristic (residual magnetic flux density $B_r$). In the pressing apparatus used in the experiment, similarly to a usual pressing apparatus, the intensity of the aligning magnetic field (the magnetic field intensity in the horizontal transverse direction) has a maximum value in the cavity center, and the intensity decreases with increased distance from the cavity center. Specifically, as the fall distance increases, the magnetic field intensity in the fall start position decreases. In the case of the experiment of FIG. 6, when an aligning magnetic field in which the maximum value of about 1205 kA/m is shown in the cavity center portion is formed, a magnetic field intensity in a fall start position shows a value in the range of about 525 to about 380 kA/m, depending on the fall distance. In more detail, the magnetic field intensity in the position of fall distance of 90 mm was 525 kA/m, the magnetic field intensity in the position of fall distance of 115 mm was 454 kA/m, the magnetic field intensity in the position of fall distance of 140 mm was 414 kA/m, and the magnetic field intensity in the position of fall distance of 165 mm was 382 kA/m. In FIG. 6, a solid circle indicates a "prior-art example", and indicates the result in the case where the magnetic field alignment is performed after the powder filling is performed by using a conventional feeder box. In the case of the prior-art example, an aligning magnetic field showing the maximum value of 1262 kA/m in the cavity center portion was formed.

In this example, a compact of a block-like shape having a size of 49 mm×69 mm×23 mm was produced. The compaction density was 4.1 g/cm$^3$.

It is first seen from FIG. 6 that the magnetic properties of the magnet according to the present invention are superior to the prior-art example. Next, it may be seen that the residual magnetic flux density $B^r$ increases together with the increase in the fall distance, up to a point. In the case of the experiment of FIG. 6, increase in the residual magnetic flux density $B^r$ was not observed when the fall distance exceeded 150 mm. In terms of the improvement in the residual magnetic flux density $B^r$, it is preferred that the fall distance be in the range of 90 mm to 160 mm.

In the case of the experiment of FIG. 6, the powder feeding apparatus shown in FIG. 4A was employed, so that the fall distance was not set to be shorter than 90 mm. The "fall distance" means a distance from the upper face of the die 21 to the upper face of the bottom plate 23*a* when the powder starts to drop. Even in the case where the fall distance is 90 mm or less, the degree of alignment is improved if there is any fall of the powder in the magnetic field. Thus, it is considered that the magnetic properties superior to those of the prior art can be obtained.

As for the maximum intensity of the aligning magnetic field, it is unnecessary to exhibit identical values in the powder filling step and in the pressing step. The intensity of the aligning magnetic field in the pressing step is preferably larger than the intensity in the powder filling. This is because the powder in the cavity receives a large frictional force in the pressing step, but such a frictional force is not caused in the powder filling, so that the powder can be easily oriented in a condition closer to the free fall. In this sense, in the powder filling, the magnetic field intensity in the cavity center may be about 160 to 320 kA/m.

Figure 7:
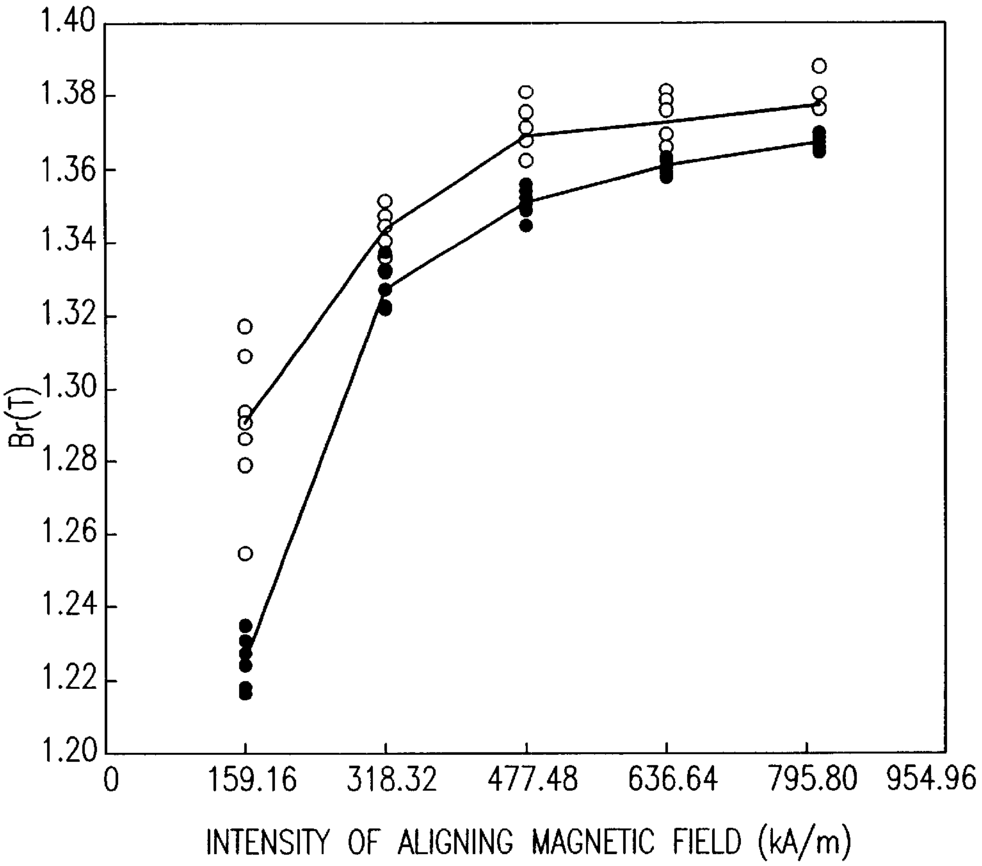
FIG. 7 is a graph showing a relationship between a residual magnetic flux density $B_r$ and an intensity of an aligning magnetic field in the embodiment of the present invention and in a comparative example.

FIG. 7 is a graph showing an aligning magnetic field intensity dependency of the residual magnetic flux density $B^r$. An open circle in the graph indicates the example of the present invention, and a solid circle indicates a comparative example in which a conventional feeder is used. The intensity of the aligning magnetic field herein is a value measured in the center portion of the cavity. The measurement of the residual magnetic flux density was performed for four positions of each of two magnets, which were manufactured by filling and pressing with the respective aligning magnetic field intensities.

As is seen from FIG. 7, according to the present invention, irrespective of the magnitude of the aligning magnetic field intensity, the residual magnetic flux density $B^r$ increases.

According to the present invention, the magnetic powder can be aligned in the direction of the magnetic field while the magnetic powder is being filled in the cavity by using a force by which the aligning magnetic field attracts the magnetic powder toward the cavity center portion. Therefore, the magnetic field alignment can be realized in the powder filling before the powder receives a pressure by the self-weight thereof. In addition, it is possible to minimize the variation in degree of alignment of powder between different areas in the cavity. As a result, the magnetic properties of the magnet produced by this method are uniform, and magnets with superior magnetic properties can be provided with good yielding percentage. The effect can be effectively attained especially for magnetic powder (specific gravity of 7.5 g/cm$^3$ or more) for an R—Fe—B type rare earth magnet of which the specific gravity is relatively large.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A method for feeding magnetic powder into a cavity of a pressing apparatus, comprising the steps of:

placing magnetic powder outside a cavity of a pressing apparatus;

forming a magnetic field in a space including the cavity; and filling the cavity by moving the magnetic powder into the cavity while the magnetic powder is oriented in a direction of the magnetic field, wherein said moving of the magnetic powder is effected by an attractive force exerted on the magnetic powder by the magnetic field;

wherein said moving of the magnetic powder is performed after the start of said step of forming a magnetic field.

2. A method for feeding magnetic powder into a cavity of a pressing apparatus, comprising the steps of:

providing magnetic powder outside a cavity;

forming a magnetic field in a space including the cavity; and filling the cavity by dropping the magnetic powder into the cavity using an electromechanical mechanism; wherein the timing of said dropping is based on formation of the magnetic field, said mechanism comprising a member for supporting magnetic powder against the weight of said magnetic powder; and downwardly dropping said magnetic powder by the application of an aligning magnetic field.

3. The method according to claim 1 or 2, wherein said filling step is performed when the intensity of the magnetic field reaches a predetermined value.

4. The method according to claim 1 or 2, further comprising the step of pressing the magnetic powder in a pressing direction inside the cavity; wherein the direction of the magnetic field is perpendicular to the pressing direction.

5. The method according to claim 1 or 2, wherein the magnetic field is directed substantially in a horizontal direction inside of the cavity.

6. The method according to claim 1 or 2, further comprising the steps of:

adapting a member for preventing the magnetic powder from moving until the magnetic field is formed, and driving the member after the magnetic field is formed, thereby enabling the magnetic powder to move.

7. A method for feeding magnetic powder into a cavity of a pressing apparatus, comprising the steps of:

placing magnetic powder above the cavity;

forming an aligning magnetic field in a space including the cavity; and filling the cavity by dropping the magnetic powder into the cavity while the magnetic powder is oriented in a direction of the magnetic field, wherein the dropping of the magnetic powder is affected by an attractive force exerted on the magnetic powder by the magnetic field, said method further comprising the steps of:

adapting a member for preventing the magnetic powder from moving until the magnetic field is formed; and driving the member after the magnetic field is formed, thereby enabling the magnetic powder to move.

8. The method according to claim 7, wherein a direction of the force by which the aligning magnetic field attracts the powder is essentially the same as the direction of the force of gravity on the magnetic powder.

9. The method according to claim 7, wherein the volume of magnetic powder placed above the cavity is less than or equal to the volume of the cavity.

10. The method according to claim 7, further comprising the step of pressing the magnetic powder in a pressing direction inside the cavity; wherein the direction of the magnetic field is perpendicular to the pressing direction.

11. The method according to claim 7, wherein the aligning magnetic field is directed in a horizontal direction in the inside of the cavity.

12. The method according to claim 7, wherein said step of placing the magnetic powder above the cavity is performed using a powder vessel provided with an open and close mechanism that maintains a closed state by the weight of the magnetic powder, and can be downwardly opened by the attractive force between the aligning magnetic field and the magnetic powder.

13. A method for producing a magnetic powder compact, comprising the steps of:

feeding magnetic powder into a cavity of a pressing apparatus by the method of claim 1, 2, or 7; and compressing and compacting the magnetic powder in the cavity.

14. The method of claim 13, further comprising the step of:

continuously applying the aligning magnetic field while performing said step of compressing and compacting the magnetic powder.

15. A method for manufacturing in a magnet, comprising the steps of:

feeding magnet powder into a cavity of a pressing apparatus by a method of claim 1, 2 or 7;

compressing and compacting the magnetic powder inside the cavity, thereby producing a compact; and sintering the compact.

16. The method of claim 15, further comprising the step of:

continuously applying the aligning magnetic field while performing said step of compressing and compacting the magnetic powder.

17. The method of claim 15, wherein the aligning magnetic field applied in said compressing and compacting step has substantially the same intensity distribution as the aligning magnetic field applied during said filling step.

18. The method of claim 15, wherein the aligning magnetic field applied in said compressing and compacting step is applied in substantially the same direction as the aligning magnetic field applied during said filling step, at least in the cavity.

19. The method of claim 15, wherein the maximum magnetic field intensity of the aligning magnetic field applied in said compressing and compacting step is larger than the maximum magnetic field intensity of the aligning magnetic field applied during said filling step.

20. A magnetic powder feeding apparatus, comprising:

a member for supporting magnetic powder against the weight of said magnetic powder; and means for downwardly dropping said magnetic powder by the application of an aligning magnetic field.

21. The magnetic powder feeding apparatus of claim 20, wherein said means for dropping said magnetic powder is electromechanical, and said electromechanical means is adapted to drop said magnetic powder after the initial application of said aligning magnetic field.

22. A magnetic powder feeding apparatus, comprising:

a vessel for containing magnetic powder, said vessel supported above a cavity of a pressing apparatus, wherein said pressing apparatus is variably subjected to an external aligning magnetic field;

a bottom plate pivotably supported by said vessel and adapted to support said magnetic powder; and means for opening and closing said bottom plate against the weight of said magnetic powder, wherein said means pivots said bottom plate when said aligning magnetic field attracts said magnetic powder, thereby dropping said magnetic powder into said cavity.

23. The apparatus according to claim 22, wherein said vessel and said bottom plate are made of nonmagnetic material.

24. A powder pressing apparatus, comprising:

a magnetic powder feeding apparatus according to claim 20 or 21; and a die adapted for receiving said magnetic powder from said magnetic powder feeding apparatus, said die comprising a magnetic material having a saturation magnetization of 0.05 to 1.2 tesla.

* * * * *